(No Model.)

5 Sheets—Sheet 1.

A. B. EDMANDS.
Eyelet Setting Machine.

No. 239,036. Patented March 22, 1881.

Witnesses:
Benj. Andrews Jr.
E. E. Chandler

Inventor:
Artemas B. Edmands
by N. C. Lombard
Attorney.

N. PETERS, PHOTO-LITHOGRAPHER, WASHINGTON, D C.

(No Model.) 5 Sheets—Sheet 3.

A. B. EDMANDS.
Eyelet Setting Machine.

No. 239,036. Patented March 22, 1881.

Witnesses:
Benj. Andrews, Jr.
E. E. Chandler

Inventor:
Artemas B. Edmands
by N. C. Lombard
Attorney.

(No Model.) 5 Sheets—Sheet 4.
A. B. EDMANDS.
Eyelet Setting Machine.
No. 239,036. Patented March 22, 1881.
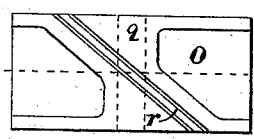
Fig. 8.
Fig. 9.
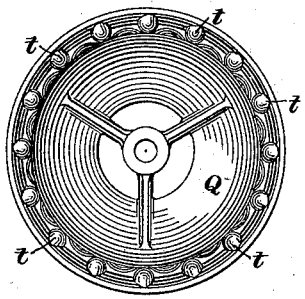
Fig. 7.
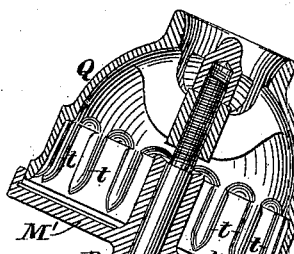
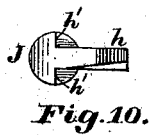
Fig. 10.
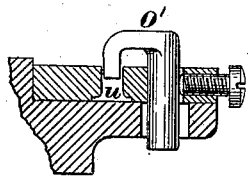
Fig. 11.
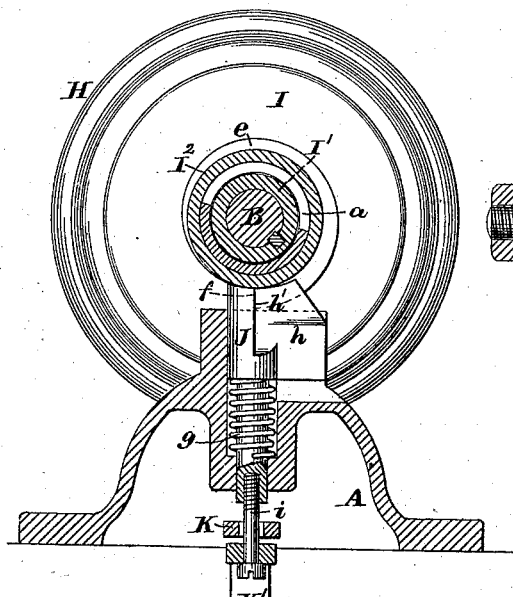
Fig. 6.
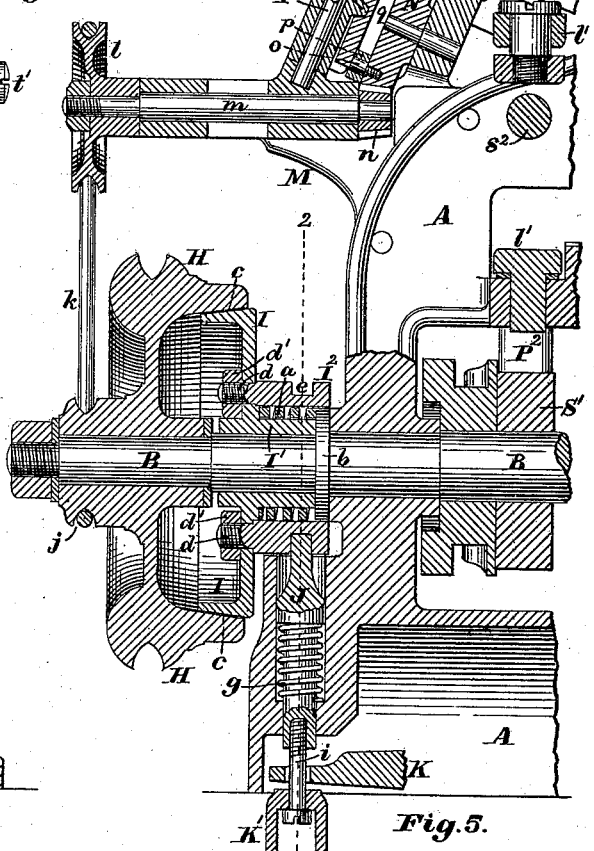
Fig. 5.
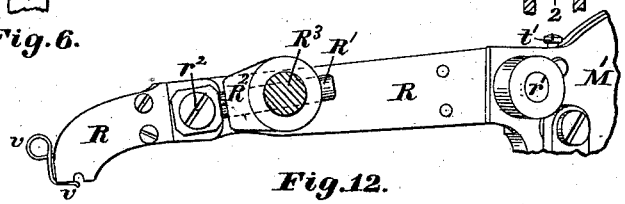
Fig. 12.
Witnesses:
Benj. Andrews, Jr.
E. E. Chandler.
Inventor:
Artemas B. Edmands
by N. C. Lombard
Attorney.
N. PETERS, PHOTO-LITHOGRAPHER, WASHINGTON, D.C.

(No Model.) 5 Sheets—Sheet 5.

A. B. EDMANDS.
Eyelet Setting Machine.

No. 239,036. Patented March 22, 1881.

Witnesses:
Benj. Andrews Jr.
E. E. Chandler

Inventor:
Artemas B. Edmands
by N. C. Lombard
Attorney.

UNITED STATES PATENT OFFICE.

ARTEMAS B. EDMANDS, OF MILFORD, MASSACHUSETTS.

EYELET-SETTING MACHINE.

SPECIFICATION forming part of Letters Patent No. 239,036, dated March 22, 1881.

Application filed August 24, 1880. (No model.)

*To all whom it may concern:*

Be it known that I, ARTEMAS B. EDMANDS, of Milford, in the county of Worcester and State of Massachusetts, have invented certain new and useful Improvements in Eyelet-Setting Machines, of which the following, taken in connection with the accompanying drawings, is a specification.

My invention relates to that class of eyelet-setting machines in which the hole is punched in the material and the eyelet is set therein at one operation, and is an improvement upon the machines described and illustrated in Letters Patent Nos. 141,211 and 151,864, granted to me July 29, 1873, and June 9, 1874, respectively; and it consists in certain novel devices for facilitating the separation and delivery of the eyelets to the action of the setting-tools, for stopping the machine at will at a given point in its revolution, and for insuring the proper insertion of the eyelet through the material, the construction and operation of which devices will be readily understood by reference to the description of the drawings, in which—

Figure 1:
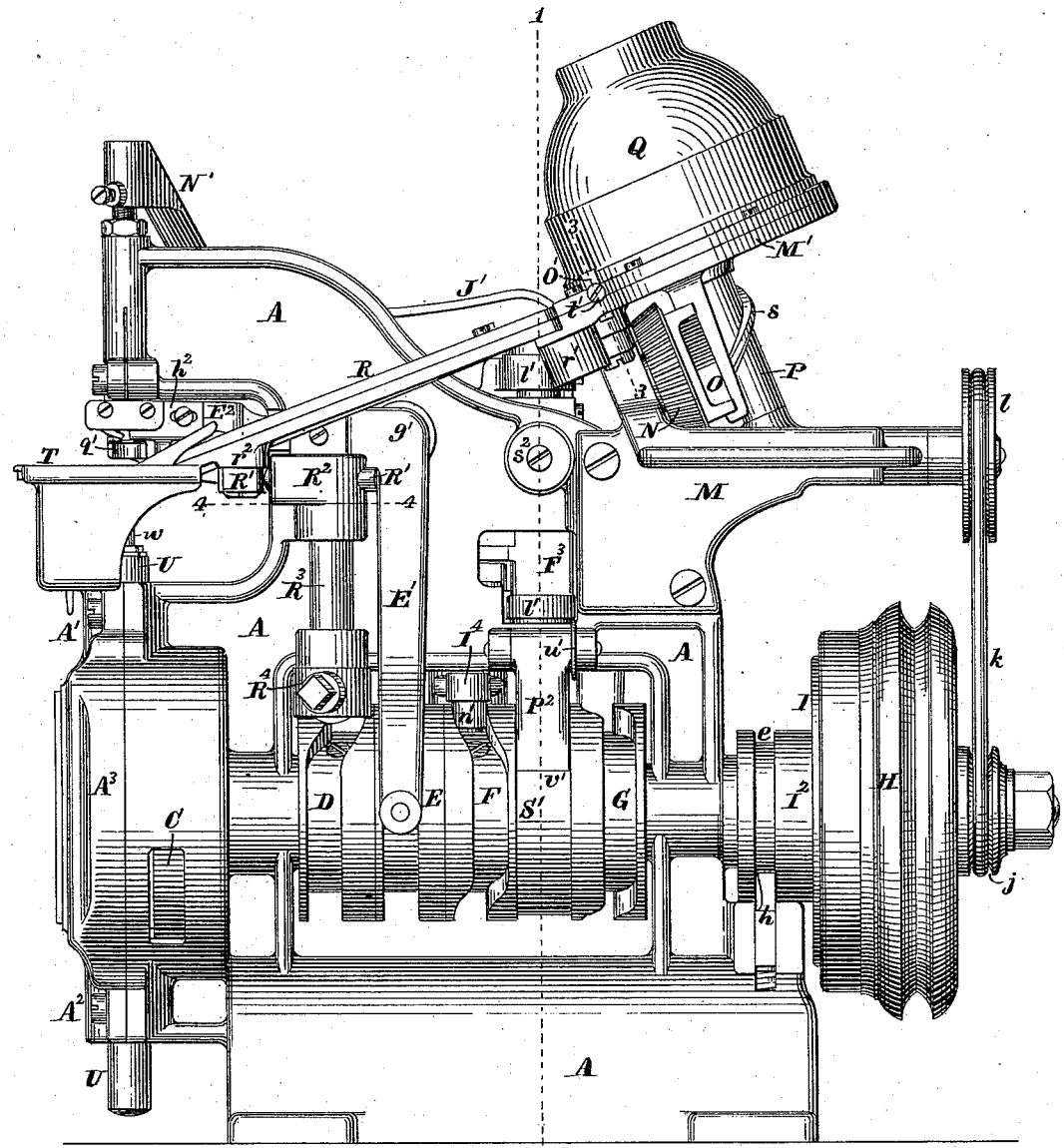
Figure 2:
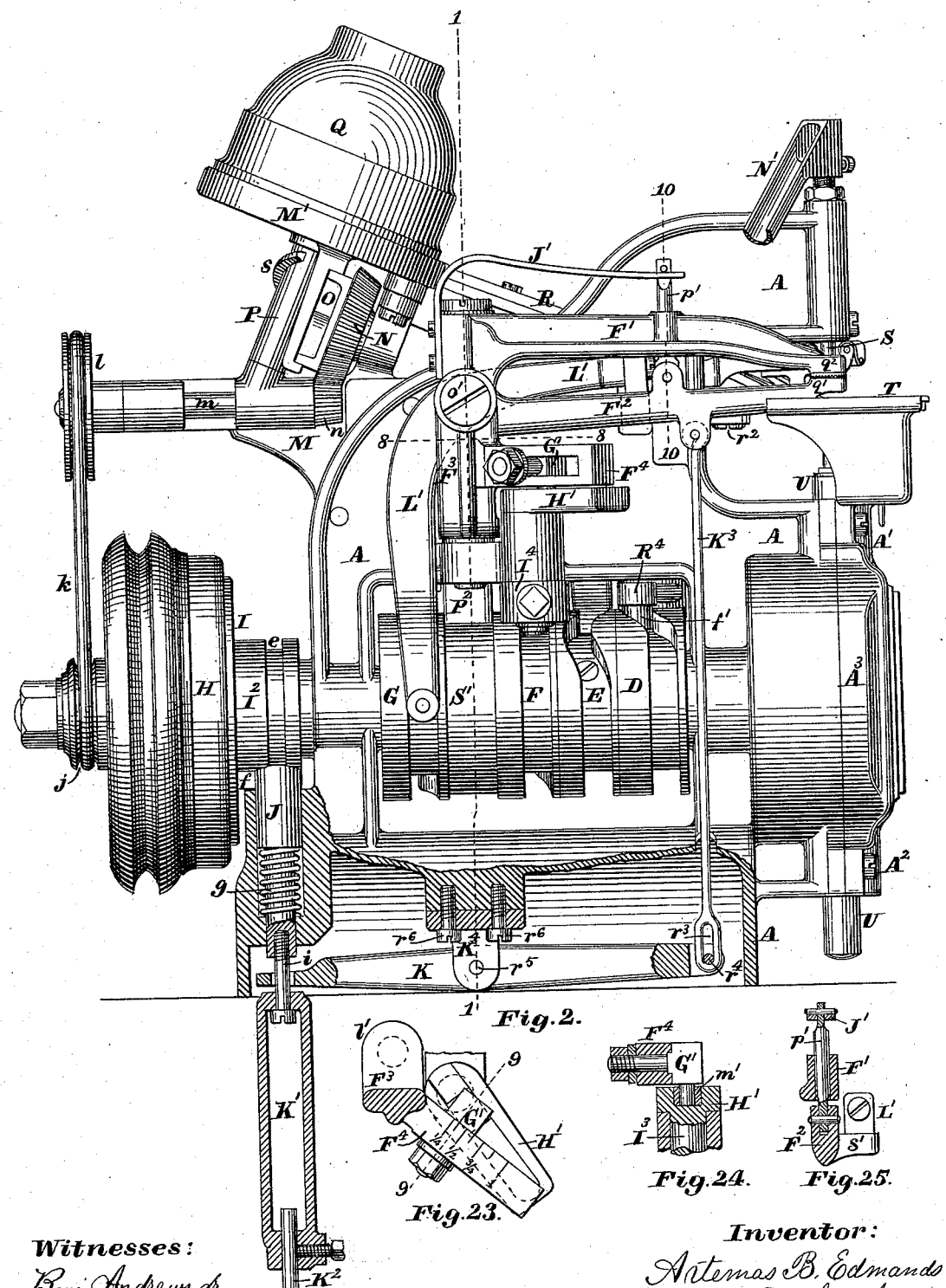
Figures 3, 4:
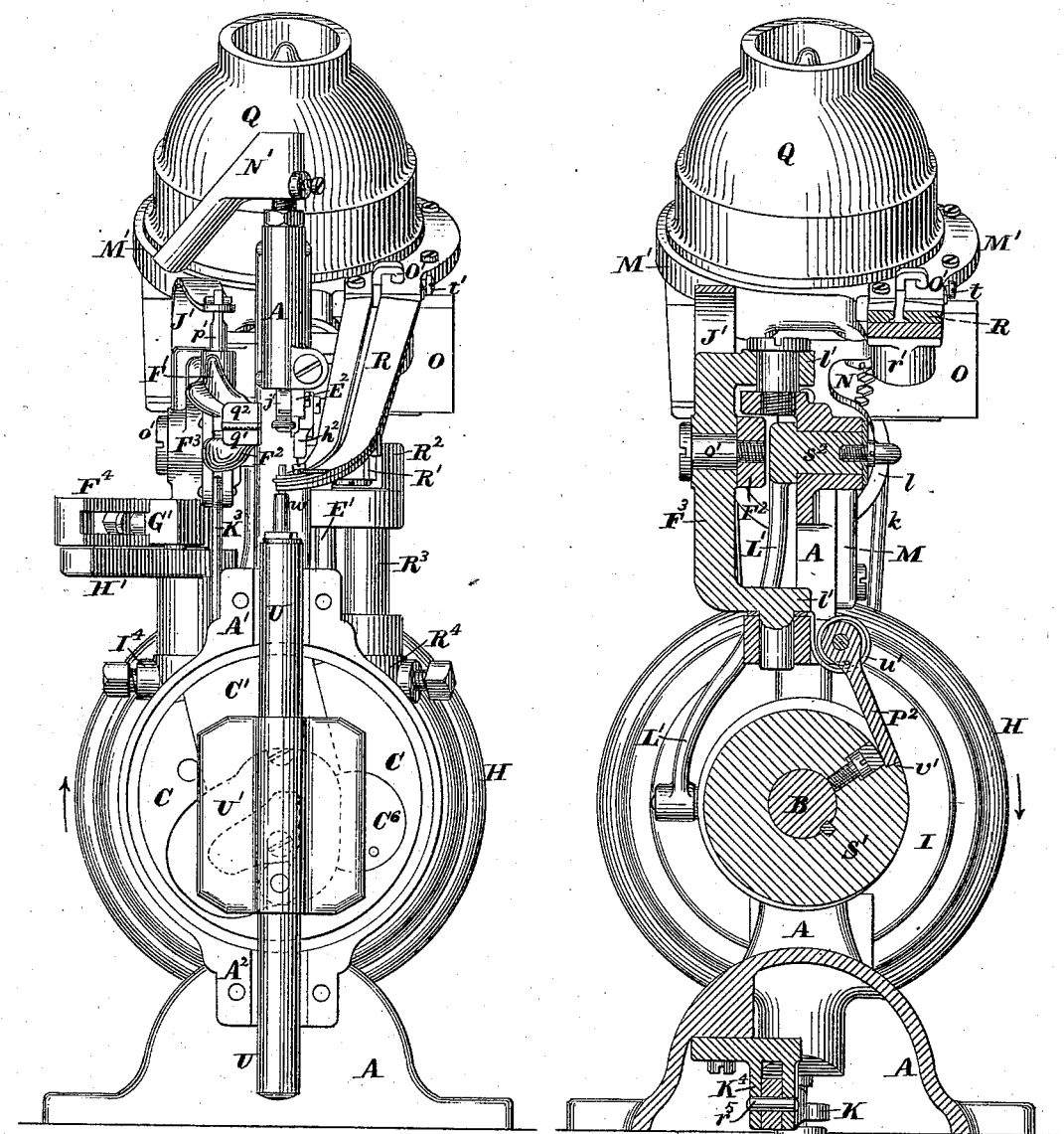
Figure 22:
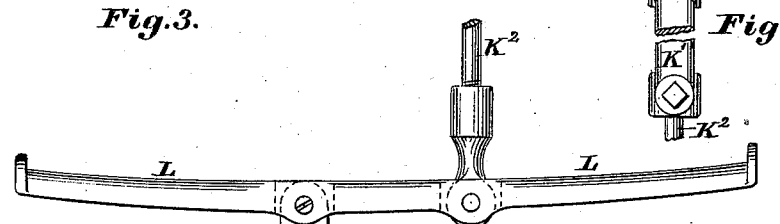
Figure 14:
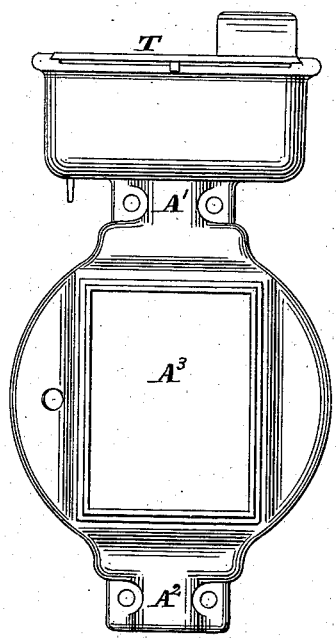
Figure 16:
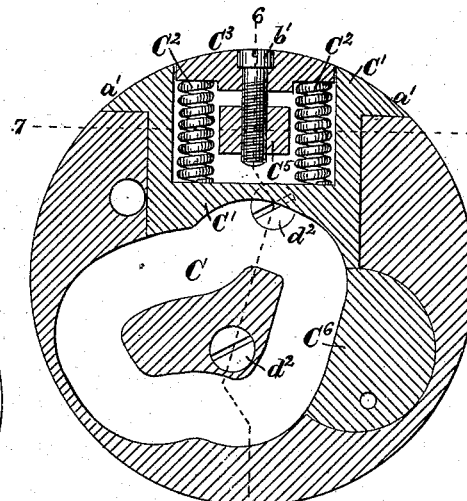
Figure 17:
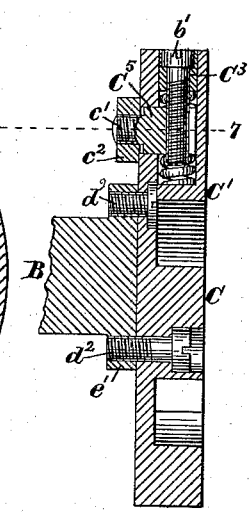
Figure 15:
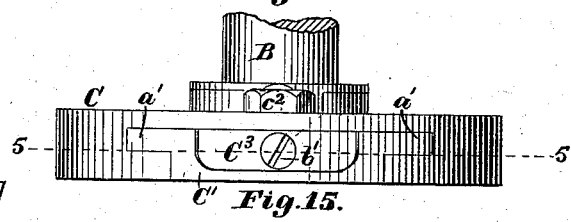
Figure 13:
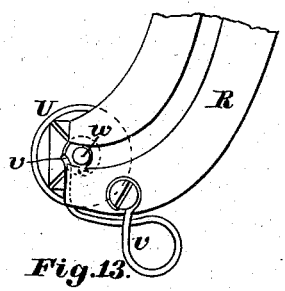
Figure 18:
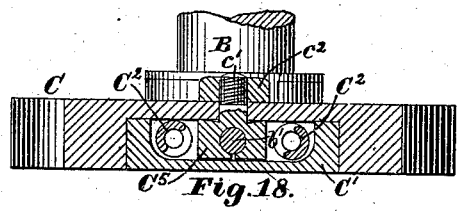
Figure 19:
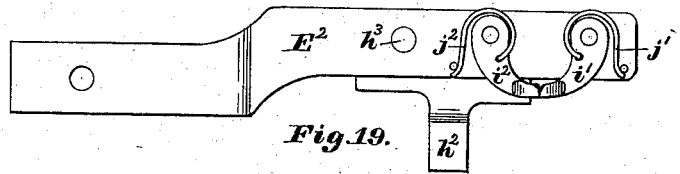
Figure 20:
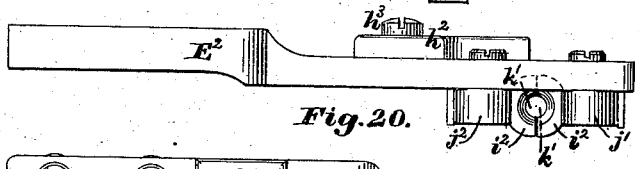
Figure 21:
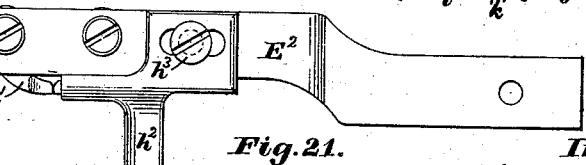

Figure 1 is a side elevation of a machine embodying my invention. Fig. 2 is an elevation of the opposite side, partly in section. Fig. 3 is a front elevation of the machine with the work-support and front plate removed. Fig. 4 is a sectional elevation, looking toward the rear, the cutting-plane being on line 1 1 on Figs. 1 and 2. Fig. 5 is a central vertical section of the rear portion of the machine. Fig. 6 is a vertical section on line 2 2 on Fig. 5. Fig. 7 is an inverted plan of the hopper. Figs. 8 and 9 are, respectively, an elevation and a longitudinal section of the reciprocating bar for operating the hopper. Fig. 10 is a plan of clutch stop dog. Fig. 11 is a transverse section through raceway or chute on line 3 3 on Fig. 1. Fig. 12 is a horizontal section through the lever for operating the pivoted raceway, on line 4 4 on Fig. 1, looking up, and showing an inverted plan of the pivoted raceway or chute. Fig. 13 is a plan of a portion of the lower end of the raceway. Fig. 14 is a front elevation of the work-support and front plate. Fig. 15 is an edge view or plan of the cam for operating the setting-plunger. Fig. 16 is a vertical section of same on line 5 5 on Fig. 15. Fig. 17 is a section on line 6 6 on Fig. 16. Fig. 18 is a section on line 7 7 on Figs. 16 and 17. Figs. 19, 20, and 21 are details of the presser-foot. Fig. 22 is an elevation of the treadle. Fig. 23 is a partial detail sectional plan on line 8 8 on Fig. 2. Fig. 24 is a vertical section on line 9 9 on Fig. 23, and Fig. 25 is a vertical section of feed-levers on line 10 10 on Fig. 2.

A is the frame of the machine, adapted to be secured upon a bench or table, (not shown,) and carrying all the working parts of the mechanism, except a foot-treadle for disengaging the clutch-dog and opening the feed-nippers for the insertion and removal of the work.

B is the driving-shaft, mounted in suitable bearings formed in the frame A, and having firmly secured thereon the cams C, D, E, F, and G, and has loosely fitted to its rear end the pulley H, adapted to revolve freely on said shaft, or to be made to revolve therewith by engagement with the tapering periphery of the friction-wheel I, so mounted upon the shaft B that it must revolve therewith, while it is free to be moved endwise thereon by the tension of the spring $a$, inclosed in an annular chamber formed in the hub of said wheel, between the bottom of which and the collar $b$ on the shaft B said spring is compressed, so that its tendency to expand will move the wheel I toward the pulley H till its outer tapering periphery engages with the correspondingly-tapered inner peripheral surface, $c$, of said pulley, and the wheel I and shaft B are compelled to rotate with the pulley H, as motion is imparted thereto by a belt (not shown) leading thereto from some suitable center or main shaft, (also not shown.)

The chamber to receive the spring $a$ is formed by the hub I' of the wheel I, made in one piece therewith, and the hardened-steel sleeve I², secured to the wheel by means of two threaded studs, $d$ $d$, formed in one piece therewith, and the nuts $d'$ $d'$, the outer periphery of said sleeve being of a scroll form and provided with the concentric groove $e$, and upon either side thereof with the shoulder $f$, the purpose of which will presently appear.

J is a clutch-dog, having a cylindrical shank fitted to a vertical bearing formed for the purpose in the frame A and surrounded by the coiled spring g, and provided at its upper end with the wing h and shoulders h′ h′, the wing h, at its junction with the shoulders h′ h′, being of a width to fit the groove e in the sleeve I², and reduced in thickness toward its front edge an amount equal to the movement of the wheel I and sleeve I² along the shaft B, to cause it to engage with the pulley H, said taper of the wing h serving to withdraw the wheel or disk I from engagement with the pulley H by its engagement with the side of the groove e toward the front end of the machine as the shoulder f approaches the shoulder h′ on the dog, whenever the dog is left free to be moved upward by the expansion of the spring g.

The lower end of the dog J is connected by the screw-bolt i to the lever K, and to the stirrup K′, the lower end of which is attached to a rod, K², leading therefrom to a double-armed treadle, L, suitably mounted near the floor, and shown in the figures.

The outer hub of the pulley H is provided with a groove, j, to receive the belt k, which leads therefrom to and partially around the grooved pulley l, secured upon the outer end of the horizontal shaft m, having its bearings in the stand M, bolted to or cast upon the rear upper portion of the frame A, and having secured to its inner or front end the pinion n, which engages with and imparts motion to the bevel-gear wheel N, in the back side of which is set the crank-pin o, carrying the square block p, (fitted to slide in the vertical slot q in the front side of the plate or bar O,) which, by its rotations, imparts to said bar or plate a reciprocating motion in a horizontal direction. The back side of the bar O has cut therein a single oblique groove, r, which engages with the spiral tooth s, formed upon and projecting from the sleeve P, firmly secured to the shaft P′, which has its bearings in the stand M and the disk M′, which is bolted thereto, and forms the stationary bottom of the eyelet-hopper, said shaft having adjustably secured to its upper end the dome-shaped hopper Q in such a manner that it has imparted to it, through the medium of said shaft P′, sleeve P, bar O, and crank-wheel N, an oscillating motion around its axis. The hopper Q is open at the top, and is so adjusted on the shaft P′ that its lower edge is raised above the upper surface of the disk M′ a distance a little in excess of the length of the eyelet being used, the disk M being provided with a raised annular rib or lip, which incloses the lower end of the hopper Q, as shown in Fig. 5. The shaft P′ and the disk M′ are inclined toward the front of the machine in such a manner that the eyelets which are placed in the hopper Q fall by the force of gravity toward the front or lowest part of the hopper, where they would lie in a mass but for the agitation they receive from the oscillation of the hopper Q. The lower portion of the hopper Q, which is nearly cylindrical in form, has formed upon its inner surface a series of inwardly-projecting ribs, t, arranged parallel to each other and to the axis of the hopper, said ribs being semicircular in cross-section, and terminating at their lower ends in the form of inverted semi-cones, the apexes of which reach nearly to the bottom edge of the hopper, as shown in Figs. 5 and 7. The peculiar form of the ribs t herein shown and described constitutes one feature of my invention.

Hoppers have been used in eyelet-setting machines which were provided with semicircular ribs upon their inner surfaces; but said ribs had their lower ends cut square off at points some distance above the lower edge of the hopper, and had set in said ends bristle brushes, which acted upon the eyelets to agitate them; but the bristles were constantly breaking off and wearing away, so that the brushes had to be renewed quite often at considerable expense, and the broken bristles soon choked up the outlet of the hopper, so as to retard or prevent the discharge of the eyelets therefrom. By dispensing with the brushes altogether and extending the ribs t downward in the form of inverted semi-cones having curved sides, as shown, these objections are entirely overcome and an abundant supply of eyelets is furnished to the setting-tools, and may be kept up for years without any expense for repairs of the hopper. The eyelets are arranged in a circular row, resting on their flanged ends upon the disk M′, directly beneath the lower edge of the hopper Q, by the constant oscillating motion of the hopper, and they escape through the opening u into the inclined chute R, down which they slide till they are arrested by the spring-stop v at a point directly between the setting-tools.

S is the clinching-anvil, in the form of a tube, and serving the purpose of a female die, which, co-operating with a male punch, forms the hole in the material to receive the eyelet, said anvil being adjustably set in the upper part of the frame A above the table T, upon which the work to be eyeleted rests.

U is the setting-plunger, mounted in bearings A′ A², and provided with a broad flat plate, U′, the back side of which lies close against the front face of the cam C, the path of which acts upon an anti-friction roll mounted upon a stud set in the rear side of said plunger, (said truck and stud being shown in dotted lines in Fig. 3,) and imparts thereto an intermittent vertical reciprocating motion.

In the upper end of the plunger U is set the setting-tool w, which serves as a male punch to form the hole in the material and to take the eyelet from the chute, insert it in the material, and clinch it, all at one upward movement of the plunger, substantially in the manner described in Letters Patent No. 124,346, granted to me March 5, 1872.

As the thickness of the material in which the eyelets are to be set varies considerably, even in the same shoe, it becomes necessary that there should be some yield or give to the setting-tools, or else there would be danger of injuring the shoe, and to this end I have provided the cam C with a yielding section, C', at that point in its path where the work of clinching the eyelet is done.

The construction of the cam C may be readily understood by reference to Figs. 15, 16, 17, and 18, where C is the body of the cam; C', the movable section, made of steel and hardened, and having formed in its rear side a rectangular recess, and provided with ears or lips $a'$ $a'$, which engage with correspondingly-shaped notches or grooves in the cam C to register it laterally.

$C^2$ $C^2$ are two powerful spiral springs, which are placed in the recess of the section C' and between it and the cap $C^3$, which is held in position and adjusted to increase or diminish the tension of the springs $C^2$ by means of the screw $b'$, which screws into the nut $C^5$ in an obvious manner. The nut $C^5$ is of peculiar construction, being provided with a threaded shank, $c'$, by which it is securely attached to the cam C, and is split through upon the side opposite said shank, and has its shoulder which bears against the cam C so formed that it will bear upon said cam only at the extreme outer corners of said shoulder upon two opposite sides of said shank, so that by tightening up the nut $c^2$ the two opposite sides of the nut will be made to gripe the screw $b'$, and thus prevent said screw from becoming accidentally unscrewed.

$C^6$ is a piece of steel set in the side of the cam C, to prevent undue wear at that point. The cam C is secured to the end of the shaft B by the screws $d^2$ $d^2$ and a tongue, $e'$, formed on the end of said shaft and fitting into a groove in the back side of said cam.

$A^3$ is the cap-plate for bearings A' and $A^2$, and completely incloses the cam C and plunger U, and extends upward to form a support for the work-table T, which is fitted to dovetailed slides formed therein.

The chute or raceway R is pivoted at $r'$ to the disk M', and is also pivoted at $r^2$ to the arm R', which is fitted to and moves freely endwise through a bearing in the short lever $R^2$, secured to the upper end of the vertical rocker-shaft $R^3$, to the lower end of which is secured the lever $R^4$, carrying at its free end an anti-friction roll, $f'$, which fits into and is acted upon by the path of the cam D, to give to the chute R an intermittent vibratory motion about the pivot $r'$, to withdraw it from the eyelet when the punch $w$ has entered the eyelet in its upward movement, the lower end of the chute being curved, so that its groove at the point of discharge has a direction at right angles, or nearly so, to the general line of said groove, to enable this sidewise movement of the chute to leave the eyelet upon the punch $w$.

The cam E acts upon the pendent arm of the elbow-lever E', which is pivoted to the frame A at $g'$, so as to impart thereto an intermittent vibratory motion about its pivot $g'$, the horizontal arm of said lever carrying the removable presser-foot arm $E^2$, the office of which is to press the leather down upon the eyelet before the clinching commences.

The construction and arrangement of the parts of the presser-foot and its arm will be best understood by reference to Figs. 19, 20, and 21, in which $E^2$ is the presser-foot arm, $h^2$ is an adjustable gage or guide for the work, secured upon the arm $E^2$ by the screw $h^3$, and $i'$ and $i^2$ are two pivoted toes, the movable ends of which are held in contact with each other by the tension of the springs $j'$ and $j^2$, and together serve as a presser-foot to force the leather or other material down over the body of the eyelet against its flange, a semicircular notch, $k'$, being cut in the movable end of each of said toes, to enable them to press upon the material close up to and around the body of the eyelet, which projects upward through the hole formed by the two semicircular notches $k'$ $k'$. The upper corners of the toes $i'$ and $i^2$ around the notches $k'$ $k'$ are beveled, so that as the arm $E^2$ is raised after having forced the material down upon the flange of the eyelet, and the eyelet is moved upward by the punch $w$ to clinch the eyelet, the toes $i'$ and $i^2$ will be forced apart by the anvil S, to permit the proper action of the clinching-tools upon the eyelet.

The material to be eyeleted is moved forward after the setting of each eyelet by a pair of feed-jaws, F' and $F^2$, the upper one, F', being formed in one piece with the upright $F^3$, its ears $l'$ $l'$, by which it is pivoted to the frame A, and the slotted arm $F^4$. The slotted arm $F^4$ carries the adjustable block or square-headed bolt G', the head of which is provided with a shank on its under side to receive the block $m'$, fitted to slide in the groove formed in the upper side of the lever H', formed upon or secured to the upper end of the short rocker-shaft $I^3$, to the lower end of which is secured the lever $I^4$, which carries at its movable end an anti-friction roll, $n'$, which fits into and is acted upon by the path of the cam F, by which arrangement the feed-jaws F' and $F^2$ have imparted thereto an intermittent vibratory motion in a horizontal plane, or about a vertical axis of a greater or less length, according to the position of the bolt G' in the slot of the arm $F^4$. The lower feed-jaw, $F^2$, is pivoted at $o'$ to the upright $F^3$, and has pivoted to its upper side the rod $p'$, which passes through an opening in the jaw-lever F', and is connected at its upper end with the spring J' in such a manner that the tension of said spring shall move said jaw-lever $F^2$ upward and cause the pad $q'$ at its front end to be forced hard against the serrated pad $q^2$ on the front end of the jaw-lever F', or upon the material placed between said pads. The jaw-lever $F^2$ also has pivoted to its lower side the upper end of the connecting-rod $K^3$, the lower end of which is provided with the slot $r^3$, by means of which and the pin $r^4$ it is connected to the front end of the lever K, pivoted at $r^5$ to the stand $K^4$, secured by the screws $r^6$ to the frame A within the chamber of its base, as shown in Figs. 2 and 4, the front end of said lever K being connected to the clutch-dog J and the treadle-rod K², as before described, and as shown in Fig. 2, so that by placing the foot upon the short arm of the treadle L the stirrup K' will be moved upward, and, coming in contact with the rear end of the lever K, will cause said lever to move about its fulcrum and pull down the front end of the feed-jaw lever F² against the tension of the spring J', to permit the insertion of the work between the jaws F' and F², or the withdrawal of the same after the eyelets have been set. The feed-jaw lever F² is also provided with a lug, s', which projects laterally therefrom upon its side next to the frame A, upon which the front end of the short arm of the elbow-lever L', fulcrumed at s² to the frame A, bears, the lower end of the long arm of said lever being provided with an anti-friction roll, which fits into and is acted upon by the path of the cam G in such a manner as to impart to said lever an intermittent vibratory motion about its fulcrum s². By this arrangement of mechanism the jaws F' and F² are automatically opened and closed at regular intervals, and by the operations of the cam F, levers I⁴, H', and F⁴, and the adjustable blocks G' and m', said jaws are moved laterally to the left, or away from the setting-tools, while they are closed upon the material, and after being opened are again moved toward the setting-tools to take a new hold upon the material.

N' is a chute, down which the pieces punched from the material slide as they are discharged from the upper end of the tubular anvil S.

O' is an adjustable gage for determining the height of the opening through which the eyelet must pass from the hopper to enter and slide down the inclined chute R, said gage being held in the desired position by the set-screw t', as shown in Figs. 1, 3, 4, and 11.

P² is a stop-pawl, pivoted to the frame A, and having applied thereto the spring u' in such a manner that its tension tends to move the free end of said pawl toward the axis of the shaft B and cause it to drop inward from the shoulder v' of the scroll S' just at the time that the shoulders f on the sleeve I² come in contact with the shoulders h' on the dog J to stop the revolution of the shaft B, the office of the pawl P² and shoulder v' being to prevent a backward motion or rebound of the shaft B, and thus stop the machine with all of the operative parts in a given fixed position. This is a very important feature in the operation of the machine, as without it it would be impracticable to run the machine at the high rate of speed that is desirable, and at which it is run in practice—say from two hundred and fifty to three hundred revolutions per minute.

In operating the machine the operator first ascertains that there is a supply of eyelets in the chute R, and that the punch w has entered the lower eyelet in the chute. He then opens the feed-jaws by placing his foot upon the short arm of the treadle L, and places the work to be eyeleted upon the table T, with its rear edge inserted between the pads of the feed-jaws, when he removes his foot from the treadle, and the spring J' causes said jaws to close upon and gripe the work. He then places his foot upon the long arm of the treadle L, and, depressing it, withdraws the clutch-dog J from engagement with the groove e and shoulders f f on the hub or sleeve of the friction-wheel I, when the reaction of the spring a moves the wheel I into contact with the conical inner periphery of the pulley H, thereby causing the shaft B to revolve with said pulley. The first effect of such revolution of the shaft B is to swing the chute to one side to withdraw the eyelet which is upon the punch w from said chute, the stop-spring v yielding for the purpose, when the plunger U, with the punch w, which carries the eyelet and projects above it, is moved upward till the upper end of the punch w has pierced the material, when its upward motion ceases for the time being, and the presser-foot is moved downward to press the material down upon the flange of the eyelet, and at the same time the lower feed-jaw lever, F², is moved downward to release the gripe of the feed-jaws upon the material. A continuation of the revolution of the shaft will next cause the setting-plunger, the tool w, with the eyelet thereon, and the presser-foot, to be moved upward together till the toes i' and i² of the presser-foot are forced apart by coming in contact with the anvil S, and the eyelet is clinched, when the feed-jaws are moved toward the setting-tools, and then closed upon the material preparatory to feeding it along to the left to the proper position for the insertion of the second eyelet. The setting-plunger is now moved downward till the punch w is withdrawn from the set eyelet, when the feed-jaws are moved to the left, carrying the material with them, a distance equal to the distance apart that it is desired to set the eyelets, and at the same time the chute is vibrated toward the left till the lower eyelet is directly over the setting-punch w, when the setting-punch is moved upward again till it enters the lower eyelet in the chute and assumes the position it occupied at the commencement of the revolution. These movements will be repeated at each revolution of the pulley H so long as the operator retains his foot upon the long arm of the treadle L. When all the eyelets are set in the piece of work being operated upon, and it is desired to remove the work and insert a fresh piece, or when, for any other cause, he desires to arrest the operation of setting eyelets, he removes his foot from the treadle, and the reaction of the spring g forces the dog J upward into such a position that the beveled or tapered side of its wing h engages with the side of the groove e at the shoulder f and forces the wheel I away from contact with the pulley H just as the shoulders f f on the sleeve I² come in contact with the shoulders h' h' on the dog J, which have been interposed in the path of the shoulders $ff$ by the upward movement of the dog, and at the same instant the pawl $P^2$ is forced by the tension of the spring $u'$ to swing inward in front of the shoulder $v'$ and effectually prevent any rebound of the shaft B. The hopper Q is being constantly oscillated about its axis, and thereby agitating the eyelets contained therein, and discharging them one by one into the chute R.

What I claim as new, and desire to secure by Letters Patent of the United States, is—

1. In a machine for separating and setting eyelets, the hopper Q, provided upon its inner periphery with a series of inwardly-projecting ribs, $t$, semicircular in cross-section, and having their lower ends tapered and rounded to points or apexes which extend to, or nearly to, the lower edge of the cylindrical portion of the hopper, substantially as shown and described.

2. In an eyelet-setting machine, the combination of the hopper Q, its shaft provided with the spiral tooth or rib $s$, the bar O, provided upon one side with the oblique groove $r$ and upon the other side with the vertical groove $q$, and the crank N $o$, all arranged and adapted to operate substantially as and for the purposes described.

3. In combination with the feeding and setting devices of an eyelet-setting machine, the pulley H, friction disk or wheel I, spring $a$, the sleeve $I^2$, provided with concentric groove $e$ and the shoulders $ff$, the clutch-dog J, provided with the tapering wing $h$ and the shoulders $h'h'$, the spring $g$, and means of overcoming the tension of the spring $g$ and withdrawing the dog J from engagement with the sleeve $I^2$, substantially as and for the purposes described.

4. In combination with the feeding and setting devices of an eyelet-setting machine, the friction-pulley H I, the scroll-shaped hub $I^2$, provided with the groove $e$ and the shoulders $ff$, the clutch-dog J, means of operating said dog, the scroll S', provided with the shoulder $v'$, and the spring-actuated pawl $P^2$, all arranged and adapted to operate substantially as described.

5. In an eyelet-setting machine, the combination of the pivoted inclined chute R, extensible lever R' $R^2$, rocker-shaft $R^3$, lever $R^4$, and cam D, all arranged and adapted to operate substantially as and for the purposes described.

6. In an eyelet-setting machine, the cam C, provided with the yielding section C', adapted to operate substantially as and for the purpose described.

7. In an eyelet-setting machine, the cam C, provided with the movable section C', in combination with the springs $C^2 C^2$, the cap $C^3$, and the adjusting-screw $b'$, all constructed, arranged, and adapted to operate substantially as described.

8. The combination of the cam C, yielding section C', springs $C^2 C^2$, cap $C^3$, screw $b'$, and the nut $C^5$, provided with the shank $c'$ and undercut shoulders, and cut through upon the side opposite to said shank $c'$, substantially as and for the purposes described.

9. In combination with the tool-carrying plunger of an eyelet-setting machine and a fixed or stationary anvil, a cam for operating said plunger, provided with a path of the form substantially as described, to give said plunger three distinct and separate movements in one direction, with a period of rest between them, and a single movement in the opposite direction, a pivoted presser-foot, provided at its movable end with an opening to receive the eyelet-shank as it is moved upward in the act of setting, and a cam for vibrating said presser-foot, provided with a path constructed as shown, and adapted to give to said presser-foot an intermittent vibratory motion, substantially as described.

10. In an eyelet-setting machine, the combination of the setting-tools S and $w$, the elbow-lever E' $E^2$, the cam E, and the spring-actuated toes $i'$ and $i^2$, all constructed, arranged, and adapted to operate substantially as described, for the purposes specified.

11. In an eyelet-setting machine, the combination of the feed-jaw levers F' and $F^2$, slotted arm $F^4$, adjustable blocks G' and $m'$, levers H' and $I^4$, rocker-shaft $I^3$, cams F and G, the elbow-lever L', and the spring J', connected by its movable end to the jaw-lever $F^2$, all arranged and adapted to operate substantially as and for the purposes described.

12. In an eyelet-setting machine, the combination of the double-armed treadle L, the rod $K^2$, stirrup K', lever K, bolt $i$, clutch-dog J, friction-wheel I $I^2$, connecting-rod $K^3$, provided with the slot $r'$, feed-jaw levers F' and $F^2$, and spring J', all arranged and adapted to operate substantially as and for the purposes described.

Executed at Boston, Massachusetts, this 21st day of August, A. D. 1880.

ARTEMAS B. EDMANDS.

Witnesses:
BENJ. ANDREWS, Jr.,
E. E. CHANDLER.